United States Patent [19]

Petersen

[11] 4,147,845

[45] Apr. 3, 1979

[54] REDUCING THE MONOMER CONTENT IN EXPANDABLE THERMOPLASTIC BEADS

[75] Inventor: Jorgen Petersen, Sundsvall, Sweden

[73] Assignee: Kemanobel AB, Stockholm, Sweden

[21] Appl. No.: 927,778

[22] Filed: Jul. 25, 1978

Related U.S. Application Data

[63] Continuation-in-part of Ser. No. 858,122, Dec. 6, 1977, Pat. No. 4,105,596.

[30] Foreign Application Priority Data

Jun. 8, 1978 [SE] Sweden ............................... 7806665

[51] Int. Cl.² ................................................ C08J 9/20
[52] U.S. Cl. ......................................... 521/56; 526/80
[58] Field of Search ............................. 521/56; 526/80

Primary Examiner—Morton Foelak
Attorney, Agent, or Firm—Fred Philpitt

[57] ABSTRACT

The invention relates to a process for reducing the monomer content in expandable thermoplastic beads which are produced by polymerizing an ethylenically unsaturated monomer or a mixture of such monomers in aqueous suspension in the presence of a blowing agent. The residual monomers in both the beads and the process water are reduced by treatment of the slurry of beads and water obtained after polymerization in a vessel at a temperature above 65° C. in the presence of at least one water-soluble initiator. In order to avoid the expansion of the beads during the course of monomer reduction the vessel is kept completely filled with a liquid, preferably water, during the temperature treatment.

10 Claims, No Drawings

REDUCING THE MONOMER CONTENT IN EXPANDABLE THERMOPLASTIC BEADS

RELATED CASE

This application is a continuation-in-part of application Ser. No. 858,122 filed Dec. 6, 1977 which is U.S. Pat. No. 4,105,596.

BACKGROUND

Expandable thermoplastic beads, e.g. polyvinylidene chloride—acrylonitrile, polystyrene or styrene-acrylonitrile beads—have been produced commercially in a suspension polymerization process where the liquid monomer is dispersed in an aqueous medium containing one or several suspension agents, a hydrocarbon blowing agent and a polymerization initiator.

In the initial stage of the polymerization the monomers and the blowing agent form a droplet with only one phase. In a later stage of the polymerization the blowing agent is not soluble in the polymer phase and builds a separate phase in the form of small inclusions in the polymer droplet.

The obtained beads comprise polymer shells containing the liquid, volatile blowing agent. The beads expand by being heated to a temperature above the boiling point of the blowing agent and above the softening point of the polymer, e.g. at about 70° C. for polyvinylidene chloride-acrylonitrile beads. The beads can be used for production of cellular material, which finds many uses in e.g. the insulation and packaging industries.

A serious problem in all polymerization techniques is the residual monomer content. The monomers are more or less poisonous and since the polymerization can never be conducted to a 100% conversion, both the resulting polymerizate and process water is contaminated with residual monomers. This problem is especially accentuated in the polymerization of expandable beads as these also contain a third phase, i.e. the blowing agent, in which monomers may be dissolved.

Large amounts of acrylonitrile in copolymers (e.g. polyvinylidene chloride-acrylonitrile and styrene-acrylonitrile copolymers) are drastically restricted in their area of application and their market since free acrylonitrile in the process water and residual acrylonitrile in the beads increase the health hazards for the people handling the beads.

In recent years numerous methods for purifying polymerizates from residual monomer have been suggested (so called "stripping"), especially in the polyvinyl chloride technology. The most common methods relate to the use of elevated temperatures in order to cause diffusion of the monomers from the polymer phase. The elevated temperature increases the mobility of the monomer molecules and plasticizes the polymer and both these factors increases the rate of stripping.

Today the most commonly used method for stripping vinyl chloride from polyvinyl chloride is to treat the resulting polymer and process water with steam at temperatures within the range of 80–125° C. at ambient pressure. In certain processes the stripping is conducted at reduced pressure. Such a process is described in e.g. DT-OS No. 25 21 780.

It is not possible to use these methods in stripping monomers from expandable beads, as these are very sensitive to heat and pressure. At higher temperatures, as well as at lower pressure, the beads will expand depending on the blowing agent. Another problem is that the monomers in expandable beads, and especially acrylonitrile, are more water-soluble than vinyl chloride, and are thus more difficult to remove from the water phase. Moreover many of the commonly used monomers in the production of expandable beads have a high boiling point which makes them difficult to remove from the water phase by raising the temperature. Thus acrylonitrile has a boiling point of 77° C., styrene 145° C. and vinylidene chloride 32° C. while vinyl chloride has a boiling point of −14° C.

The high concentration of blowing agent inside the beads and the high temperature required for stripping produce a considerable pressure inside the beads and they expand in the unfilled or gas-filled part of the stripping device.

The pre-expanded beads are a problem and increase the cost of production. The pre-expanded beads have to be separated by filtration or by other means from unexpanded beads, and the pre-expanded beads increase the amount of waste.

Attempts have been made to avoid the pre-expansion of the beads by applying a high pressure, e.g. 500–1500 kPa of an inert gas, e.g. nitrogen, during stripping. However, this does not eliminate the formation of pre-expanded beads. The gas does not actually apply a higher pressure on the outside of the beads. An equilibrium between the gas inside the beads and the gas in the "free volume" in the stripping device is established. The beads continue to expand because of the "free volume" and the high pressure of hydrocarbon inside the beads.

THE PRESENT INVENTION

According to the present invention a stripping process for expandable beads is provided in which the pre-expansion of the beads is reduced to a considerable extent or eliminated. The process also reduces the monomer content of the process water.

According to the present invention the monomer content in expandable thermoplastic beads, produced by polymerizing an ethylenically unsaturated monomer or a mixture of ethylenically unsaturated monomers in aqueous suspension in the presence of a blowing agent, is reduced by warming the obtained slurry of expandable beads and water in the presence of a water-soluble initiator, to a temperature above 65° C. in a vessel which is completely filled with liquid media.

By using a vessel completely filled with liquid media during the temprature treatment of the expandable beads, the liquid exerts a pressure on the surfaces of the beads which prevents them from expanding during the stripping process. The residual monomers in the expandable beads are in an equilibrium with the monomers in the water phase. When the monomers are eliminated in the water phase by the water-soluble initiator it appears that more monomer is diffused outwardly from the beads and the blowing agent and into the water phase, where the monomer is again eliminated by the water-soluble initiator. This results in an effective monomer stripping process. The diffusion is fairly rapid because of the relatively high temperature.

Preferably the vessel used is a polymerizing autoclave, but any suitable vessel could be used. By connecting e.g. the autoclave to an external liquid pressure source, such as a water pipe or an expansion tank, which is partly filled with liquid media and which has suitable means for applying pressure to the water surface, the autoclave could easily be filled up during the temperature treatment of the slurry of beads. Suitably the vessel is kept filled by the addition of water. However, any suitable liquid could be used, such as, e.g. when stripping is conducted in a vessel separate from the autoclave, process water from a polymerization autoclave for expandable beads could be used. If a vessel separate from the autoclave is used for the stripping process it is of course within the scope of the invention to add more liquid medium, e.g. water, in order to fill the vessel, or to subject part of the slurry of beads and water obtained after polymerization to the stripping process.

The temperature range for the stripping treatment of the bead slurry can be varied within wide limits, and higher temperatures give a more efficient stripping. The temperature should exceed 65° C. and the upper temperature depends very much on economical considerations and could be set as high as 150° C. Good results are obtained when the temperature exceeds the glass transition temperature of the polymer in question. Suitably the range is within the interval of 70–120° C., and preferably 75–95° C. The rate of stripping also depends on the time the slurry is subjected to the temperature treatment and e.g. at a temperature of 75° C. a suitable time for acrylonitrile/polyvinylidene chloride beads is from 15 minutes up to 8 hours. At higher temperatures the time could be reduced and at a stripping temperature of 95° C. a time of about an hour or so gives a sufficient reduction of the monomer content of the beads and the process water.

The necessary pressure on the filled vessel is a function of both temperature and type of blowing agent and can easily be determined by simple tests. A blowing agent with a low boiling point naturally requires a higher pressure, otherwise the beads will expand and the pressure in the vessel will move some of the liquid medium back into the expansion tank. The necessary pressure for e.g. polystyrene beads having pentane as blowing agent is within the range of 500–2000 kpa at temperatures of 75–95° C., while isobutane, having a boiling point of about −12° C., requires a pressure within the range of 1000–2500 kpa at the same temperatures.

As examples of suitable water-soluble initiators for ethylenically unsaturated monomers may be mentioned well known inorganic, free radical initiators, such as hydrogen peroxide and potassium or ammonium persulfates, or organic free radical initiators, such as hydroperoxides, cyclohexanonperoxide or methyl isobutyl ketone peroxide. It is also within the scope of the invention to add a mixture of water-soluble initiators or a combination of a water-soluble and a monomer-soluble initiator, such as peroxides, e.g. lauroylperoxide, peroxidicarbonates, e.g. cetylperoxidicarbonate or azo compounds. The amount of water-soluble initiator can be within the range of 0.01–5% based on the weight of the charged monomer and preferably 0.1–2%.

Suitable liquid volatile blowing agents include, for example petroleum ether, pentane, iso-pentane, neopentane, hexane, heptane, cyclopentane, cyclohexane, iso-butylene, n-butane and iso-butane. The blowing agents are in a known manner used in amounts between 2–95% and preferably 5–40% by weight based on the monomers.

The process of the invention is applicable to all ethylenic unsaturated monomers or mixtures of such monomers capable of forming polymer beads containing blowing agents. As examples of such monomers can be mentioned styrene, vinylidene chloride, acrylic esters, methacrylic esters, acrylonitrile and methacrylonitrile.

The process is preferably used for expandable beads of styrene or styrene and 1–40% of its weight of copolymerizable ethylenically unsaturated monomers, especially copolymerization of styrene with 1 to 40% by weight of acrylonitrile, based on the styrene, or copolymerization of vinylidene chloride and 1 to 40% by weight of acrylonitrile or vinyl chloride, based on the vinylidene chloride, especially copolymerization of 65–90% by weight of vinylidene chloride and 35–10% by weight of acrylonitrile. Preferably the beads are produced by copolymerization, one co-monomer being acrylonitrile or methacrylonitrile.

An essential feature of the present invention is the use of a vessel which is filled with the reaction medium during the temperature stripping treatment. It will be obvious that all known polymerization recipes for the above monomers are applicable.

It is of course possible to keep the reactor filled up during the polymerization, or the final part of the polymerization, by connecting the reactor to an external pressure source or expansion tank which is partly filled with water, and which has suitable means for applying pressure to the water surface. According to one emobidment of the invention the polymerization of the beads is interrupted after 70% conversion, preferably 95% whereafter the water-soluble initiator is charged and the autoclave is filled and the temperature is raised according to the present invention during the final polymerization.

The following examples illustrate the invention, although it is understood that the invention is not limited thereto.

EXAMPLE 1 (COMPARING TEST)

A polymerization experiment was performed in a 13 l reactor equipped with a stirrer and a mantel for heating and cooling the reaction medium. The reactor was connected to an external tank which was also used for charging the monomer mixture to the reactor.

The following recipe was used during the polymerization:

Vinylidene chloride/acrylonitrile ratio 70:30:100.0 parts
Blowing agent, pentane:10.0 parts
Suspension agent, polyvinyl alcohol:1.0parts
Suspension agent, colloid of silica type:0.5 parts
Initiator, lauryl peroxide:1.0 parts
Water:400.0 parts The water 8.0 l, with the suspension agents was charged to the reactor and the reactor was evacuated for 900 s. The vinylidene chloride, acrylonitrile, pentane and initiator (totally 2.9 l) was charged to the reactor. The temperature was raised to 60° C. and kept there for 12 hours. The reactor was disconnected from the external tank during polymerization and under these conditions the pressure rose to about 500 KPa and the reactor was not kept filled.

The reactor was colled from 60° C. to about 25° C. The produced bead suspension did not contain pre-expanded beads and the amount of waste collected on DIN 60 was about 15 g per 1,000 g charged monomer.

The amounts of residual monomers in the unexpanded beads were: Acrylonitrile 3,200 mg/kg and vinylidene chloride 29,000 mg/kg. The amount of acrylonitrile monomer in the process water was 1,410 mg/kg.

EXAMPLE 2 (COMPARING TEST)

The polymerization was performed with the same recipe and the same procedure as in example 1. However, after 12 hours polymerization 1.0 parts of potassium persulphate in a water solution was then charged to the reactor which was not kept filled with liquid, and the temperature raised to 75° C. and kept for 4 hours. The amount of waste was more than 100 g per 1,000 g charged monomer.

The amounts of residual monomers in the beads were: Acrylonitrile 50 mg/kg and vinylidene chloride 1,500 mg/kg and the amount of acrylonitrile in the process water was 30 mg/kg. As can be seen from this example, although the monomer content in the beads and the process water was considerably reduced, in comparison to example 1, the amount of pre-expanded beads was unacceptably high.

EXAMPLE 3

The polymerization was performed with the same recipe and the same procedure as in example 1. However, after 12 hours of polymerization, 1.0 parts of potassium persulphate in a water solution was charged to the reactor. After such charging the reactor was connected to the external tank that served to keep the reactor completely filled up with water from the tank at a pressure of 850 kPa. The temperature was raised to 75° C. and kept there for 4 hours.

The amount of waste was only 15 g per 1,000 g charged monomer. The amount of residual monomer in the beads was: Acrylonitrile 50 mg/kg and vinylidene chloride 1,450 mg/kg. The amount of acrylonitrile in the process water was 25 mg/kg. This example illustrates that by keeping the reactor completely filled with water according to the present invention the monomer content in the beads and the process water could be considerably reduced and the amount of pre-expanded beads could be kept at a minimum.

What I claim is:

1. In the known process for producing expandable thermoplastic beads by polymerizing an ethylenically unsaturated monomer or a mixture of ethylenically unsaturated monomers in aqueous suspension in the presence of a blowing agent and recovering a slurry of expandable beads that contain undesirable amounts of the monomer, the improvement which comprises reducing the amount of monomer in said slurry of expandable beads by
   (1) introducing a water-soluble polymerization initiator into said slurry of expandable beads to cause polymerization of residual monomers contained in said slurry.
   (2) heating said slurry of expandable beads and said water-soluble polymerization initiator to a temperature above 65° C. in a vessel that is maintained completely full of liquid media so to leave no space for the accumulation of gas in the vessel, and
   (3) continuing said heating until the desired reduction in monomer content in said slurry of expandable beads is achieved.

2. Process according to claim 1, characterized in that said vessel is the polymerizing autoclave.

3. Process according to claim 1, characterized in that the temperature is within the range of 65-150° C.

4. Process according to claim 1, characterized in that the temperature is within the range of 70-120° C.

5. Process according to claim 1 characterized in that the liquid medium is water.

6. Process according to claim 1, characterized in that one monomer is acrylonitrile.

7. A process according to claim 1 wherein the mixture of monomers is vinylidene chloride/acrylonitrile.

8. A process according to claim 1 wherein expandable beads are composed of styrene.

9. A process according to claim 1 wherein the expandable beads are composed of styrene and 1-40% by weight of acrylonitrile based on the weight of the styrene.

10. In the known process for preparing expandable thermoplastic beads by introducing an aqueous suspension of at least one unsaturated monomer and a blowing agent into a polymerization vessel under polymerization conditions and carrying out polymerization the improvement which comprises reducing the monomer content of the expandable beads by
   (a) interrupting polymerization of the beads after more than 70% conversion,
   (b) charging a water-soluble polymerization initiator to the polymerization vessel to cause polymerization of residual monomers.
   (c) raising the temperature of the contents of the polymerization vessel above 65° C.,
   (d) completely filling the polymerization vessel with a liquid media so as to leave no space for the accumulation of gas in the polymerization vessel and completing the polymerization at a temperature above 65° C. while the polymerization vessel is completely filled with said liquid media.

* * * * *